US011413954B2

(12) United States Patent
Matsushima et al.

(10) Patent No.: US 11,413,954 B2
(45) Date of Patent: Aug. 16, 2022

(54) SADDLE RIDING TYPE ELECTRIC VEHICLE

(71) Applicant: HONDA MOTOR CO., LTD., Tokyo (JP)

(72) Inventors: Satoshi Matsushima, Wako (JP); Takahiro Katsuta, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 206 days.

(21) Appl. No.: 16/571,237

(22) Filed: Sep. 16, 2019

(65) Prior Publication Data
US 2020/0101833 A1 Apr. 2, 2020

(30) Foreign Application Priority Data
Sep. 27, 2018 (JP) .............................. JP2018-182285

(51) Int. Cl.
*B60K 11/04* (2006.01)
*B62M 7/02* (2006.01)
(Continued)

(52) U.S. Cl.
CPC .............. *B60K 11/04* (2013.01); *B60L 50/60* (2019.02); *B62K 11/04* (2013.01); *B62M 7/02* (2013.01);
(Continued)

(58) Field of Classification Search
CPC ......... B60K 11/04; B60K 11/02; B62K 11/04; B62M 7/02
See application file for complete search history.

(56) References Cited
U.S. PATENT DOCUMENTS 4,632,206 A * 12/1986 Morinaka ................ B62J 17/02
                                                     165/41
6,332,505 B1 * 12/2001 Tateshima .............. B62K 11/00
                                                     180/229
(Continued)

FOREIGN PATENT DOCUMENTS

CN      1110625      6/2003
EP      0755852      1/1997
(Continued)

OTHER PUBLICATIONS

Japanese Office Action for Japanese Patent Application No. 2018-182285 dated Apr. 28, 2020.
(Continued)

*Primary Examiner* — Kevin Hurley
*Assistant Examiner* — Michael R Stabley
(74) *Attorney, Agent, or Firm* — Amin, Turocy & Watson, LLP

(57) ABSTRACT

A saddle riding type electric vehicle includes a power unit which has a motor configured to drive a vehicle, a battery serving as a power source of the motor, and a control unit configured to control the motor; a vehicle body frame which supports the power unit, and has a head pipe configured to support a front wheel in a steerable manner, and a down frame extending downward from the head pipe; a first radiator and a second radiator disposed on both sides in a vehicle width direction across the down frame; and a pump which circulates cooling water between the first radiator, the second radiator and the power unit. The pump is disposed below one radiator of the first radiator and the second radiator.

7 Claims, 4 Drawing Sheets

(51) Int. Cl.
  *B62K 11/04* (2006.01)
  *B60L 50/60* (2019.01)
  *B62J 43/00* (2020.01)

(52) U.S. Cl.
  CPC ............ *B60L 2200/12* (2013.01); *B62J 43/00* (2020.02); *B62K 2204/00* (2013.01)

(56) References Cited

U.S. PATENT DOCUMENTS

| | | | | |
|---|---|---|---|---|
| 6,695,089 | B2* | 2/2004 | Adachi | B62K 11/04 |
| | | | | 180/219 |
| 8,539,929 | B2* | 9/2013 | Dees | F02F 1/40 |
| | | | | 123/198 E |
| 8,579,064 | B2* | 11/2013 | Oohashi | B62K 11/04 |
| | | | | 180/219 |
| 8,955,629 | B2* | 2/2015 | Toda | B60K 11/04 |
| | | | | 180/68.4 |
| 8,967,090 | B2* | 3/2015 | Inoue | F01P 3/18 |
| | | | | 123/41.01 |
| 9,067,634 | B2* | 6/2015 | Takasaki | B62J 23/00 |
| 9,085,230 | B2* | 7/2015 | Nakamura | F02B 61/02 |
| 9,751,393 | B2* | 9/2017 | Nakata | F28F 9/001 |
| 9,919,756 | B2* | 3/2018 | Komatsu | B62J 23/00 |
| 2010/0018793 | A1* | 1/2010 | Arnold | B62K 19/30 |
| | | | | 180/229 |
| 2015/0014080 | A1* | 1/2015 | Takasaki | B62J 15/00 |
| | | | | 180/229 |
| 2016/0090152 | A1* | 3/2016 | Sasaki | B62M 7/04 |
| | | | | 180/229 |
| 2016/0144921 | A1* | 5/2016 | Oshima | B62J 23/00 |
| | | | | 180/229 |
| 2016/0244116 | A1* | 8/2016 | Komatsu | B62J 17/02 |

FOREIGN PATENT DOCUMENTS

| | | |
|---|---|---|
| EP | 2390171 | 7/2018 |
| JP | 05-065085 | 3/1993 |
| JP | 3249152 | 1/2002 |
| JP | 3675894 | 7/2005 |
| JP | 2009-035044 | 2/2009 |
| JP | 2012-101679 | 5/2012 |
| JP | 2014-148224 | 8/2014 |
| JP | 2017-178268 | 10/2017 |
| WO | 2011/105356 | 9/2011 |

OTHER PUBLICATIONS

Indian Office Action for Indian Patent Application No. 201944038219 dated Oct. 27, 2020.

* cited by examiner

SADDLE RIDING TYPE ELECTRIC VEHICLE

CROSS-REFERENCE TO RELATED APPLICATION

Priority is claimed on Japanese Patent Application No. 2018-182285, filed on Sep. 27, 2018, the contents of which are incorporated herein by reference.

BACKGROUND

Field of the Invention

The present invention relates to a saddle riding type electric vehicle.

Background

As a saddle riding type electric vehicle, there is an electric vehicle which is equipped with a power unit having a driving motor, a battery for supplying electric power to the motor, and the like, and a cooling device having a radiator, a pump, and the like to cool the power unit (for example, see Japanese Patent No. 3249152). Japanese Patent No. 3249152 describes an electric motorcycle in which a radiator is provided between left and right down tubes, and a fan and a water pump are provided on a rear surface side of the radiator.

SUMMARY

However, if a pump is provided on the rear surface side of the radiator, there is a likelihood that piping for guiding the cooling water discharged from the radiator to the pump will have an upward inclination, and air may flow into the pump. When air flows into the pump, there may be cases in which so-called air entrainment in which air is entrained in the impeller occurs. When air is entrained in the pump, the cooling water cannot be pumped normally.

An aspect of the present invention provides a saddle riding type electric vehicle in which the occurrence of air entrainment in a radiator pump can be curbed.

A saddle riding type electric vehicle according to an aspect of the present invention includes a power unit which has a motor configured to drive a vehicle, a battery serving as a power source of the motor, and a control unit configured to control the motor; a vehicle body frame which supports the power unit, and has a head pipe configured to support a front wheel in a steerable manner, and a down frame extending downward from the head pipe; a first radiator and a second radiator disposed on both sides in a vehicle width direction across the down frame; and a pump which circulates cooling water between the first radiator, the second radiator and the power unit, in which the pump is disposed below one radiator of the first radiator and the second radiator.

According to the above configuration, since the first radiator and the second radiator are disposed on both sides in the vehicle width direction across the down frame, it is possible to reduce a region occupied by the radiator in the vertical direction, without reducing a thermal radiation area, as compared to a case in which a single radiator is disposed to avoid the down frame. Therefore, it is possible to provide a space in which the pump is disposed below the first radiator and the second radiator. Further, since the pump is disposed below one radiator of the first radiator and the second radiator, the pump suction piping leading from the radiator toward the pump inclined upward can be avoided. Therefore, air mixed into the circulation path of the cooling water is not easily mixed into the pump from the radiator, and the air flowing into the pump can be smoothly released upward. Therefore, the occurrence of air entrainment in the pump can be curbed.

In the saddle riding type electric vehicle, the first radiator may include a first radiator core, and a first tank which stores cooling water passing through the first radiator core, the second radiator may include a second radiator core, and a second tank which stores cooling water passing through the second radiator core, the first tank may extend along a predetermined direction, a first introduction port through which the cooling water discharged from the power unit is introduced, and a flow division port configured to divide the cooling water toward the second tank may be formed in the first tank, and the first introduction port and the flow division port may be formed on opposite sides across a central portion of the first tank in the predetermined direction.

According to the above configuration, most of the cooling water introduced into the first tank from the introduction port being discharged from the flow diversion port can be curbed. Accordingly, the cooling water can be diverted from the first tank to both the first radiator core and the second tank of the second radiator, and there being insufficient cooling water passing through the first radiator core can be curbed. Therefore, it is possible to efficiently use both the first radiator and the second radiator.

The saddle riding type electric vehicle may further include a discharge piping connected to a discharge part of the pump and the power unit, in which the discharge piping may extend from the pump to an opposite side across the down frame in the vehicle width direction, and may extend horizontally or downward from the pump toward the power unit in a self-supporting state in which a side stand is used.

According to the above configuration, the discharge piping inclined downward from the power unit toward the pump in a self-supporting state in which a side stand is used can be avoided. As a result, even if air is mixed into the discharge piping in the self-supporting state, the air in the discharge piping can be guided to the pump and more smoothly released upward from the pump. Therefore, the occurrence of air entrainment in the pump can be more reliably curbed.

In the saddle riding type electric vehicle, the one radiator may include a stay extending downward, and the pump may be fixed to the stay.

According to the above configuration, since the pump can be fixed using the components that constitute the one radiator, an increase in the number of components can be curbed. Further, as compared with a case in which a new component is provided in addition to one radiator to fix the pump, the positioning or the like between the one radiator and the pump becomes easier, and it is possible to improve assembling properties of the one radiator and the pump.

In the saddle riding type electric vehicle, an introduction port through which the cooling water discharged from the power unit is introduced may be formed in one radiator of the first radiator and the second radiator, and a discharge port through which the cooling water is discharged toward the power unit may be formed in the other radiator of the first radiator and the second radiator.

According to the above configuration, the cooling water introduced from the introduction port can be discharged from the discharge port after passing through both the first radiator and the second radiator. Therefore, both the first radiator and the second radiator can be used efficiently.

According to the aspect of the present invention, it is possible to provide a saddle riding type electric vehicle in which the occurrence of air entrainment in a radiator pump can be curbed.

DESCRIPTION OF EMBODIMENTS

Figure 1:
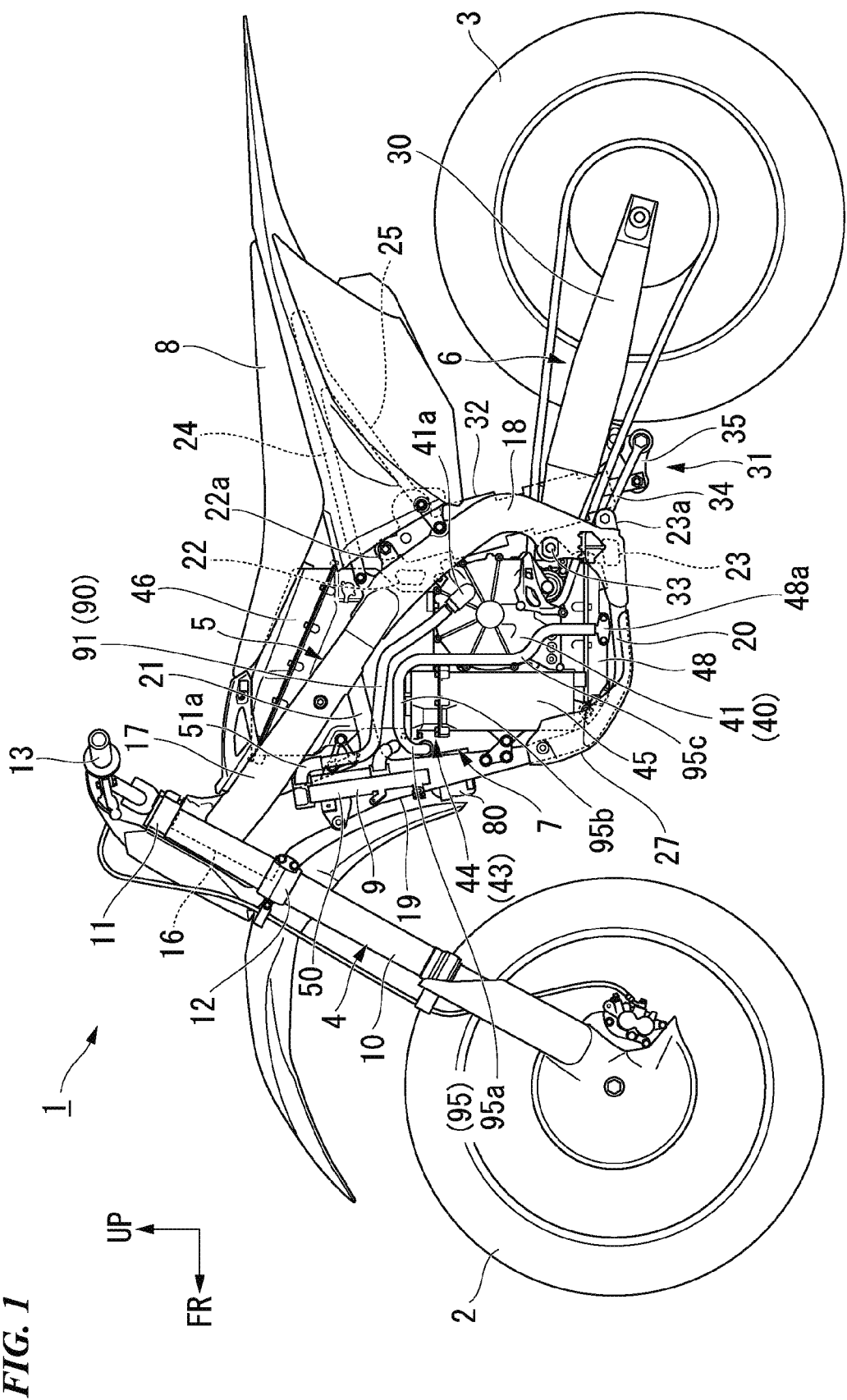
FIG. 1 is a left side view of a motorcycle according to an embodiment.

Hereinafter, embodiments of the present invention will be described based on the drawings. In the following description, directions such as a front-rear direction, an up-down direction, and a left-right direction are the same as directions in a vehicle to be described below. That is, the up-down direction corresponds to a vertical direction, and the left-right direction corresponds to a vehicle width direction. Further, in the drawings used for the following description, an arrow UP indicates an upper side, an arrow FR indicates a front side, and an arrow LH indicates a left side.

FIG. 1 is a left side view of a motorcycle according to the embodiment.

As shown in FIG. 1, a motorcycle 1 of the present embodiment is a saddle riding type electric vehicle of an off-road type. The motorcycle 1 is equipped with a front wheel 2, a rear wheel 3, a front wheel suspension system 4, a vehicle body frame 5, a rear wheel suspension system 6, a power unit 7, a seat 8, and a cooling device 9.

The front wheel suspension system 4 is equipped with a pair of left and right front forks 10 that pivotally support the front wheel 2 at a lower end portion, a top bridge 11 and a bottom bridge 12 provided between upper portions of the pair of front forks 10, a steering stem (not shown) provided between the top bridge 11 and the bottom bridge 12 and inserted into a head pipe 16, and a steering handle 13 supported on the top bridge 11. The front wheel 2 is supported by the head pipe 16 of the vehicle body frame 5 via the front wheel suspension system 4 in a steerable manner.

The vehicle body frame 5 is equipped with the head pipe 16, a pair of left and right main frames 17, a pair of left and right pivot frames 18, a single down frame 19, a pair of left and right lower frames 20, a pair of left and right gussets 21, a cross member 22 and a lower cross member 23, and these elements are coupled integrally by welding or the like.

The head pipe 16 is provided at a front end of the vehicle body frame 5. The head pipe 16 supports a steering stem. The pair of main frames 17 branch into left and right sides from the upper portion of the head pipe 16 and extend rearward and downward. The pair of main frames 17 extend, while curving to expand outward in the vehicle width direction behind the head pipe 16 in plan view as viewed from above. Each of the pair of pivot frames 18 extends downward from the rear end portions of the main frames 17. The down frame 19 extends downward from the lower portion of the head pipe 16. The pair of lower frames 20 branch into left and right sides from the lower end portion of the down frame 19 and extend rearward, and are connected to the lower end portions of the pivot frames 18.

The pair of gussets 21 connect the main frame 17 and the down frame 19. The pair of gussets 21 branch into left and right sides from the upper portion of the down frame 19 to extend rearward, and are connected to the lower portions of the main frames 17. The cross member 22 extends in the vehicle width direction and connects the upper portions of the pair of pivot frames 18 to each other. A cushion support bracket 22a that extends rearward and upward is fixed to a central portion of the cross member 22 in the vehicle width direction. A rear cushion 32, which will be described below, is connected to the cushion support bracket 22a. The lower cross member 23 extends in the vehicle width direction and connects the lower portions of the pair of pivot frames 18 to each other. A link support bracket 23a extending rearward is fixed to the lower cross member 23. A link arm 34, which will be described below, is connected to the link support bracket 23a.

The vehicle body frame 5 is further equipped with a pair of left and right seat rails 24 and a pair of left and right support rails 25. Each of the pair of seat rails 24 is connected to the upper end portion of the pivot frame 18 and extends rearward and upward from the pivot frame 18. The pair of seat rails 24 support the seat 8 from below. The pair of support rails 25 are connected to the pivot frame 18 below the seat rails 24. The pair of support rails 25 extend rearward and upward from the pivot frame 18 and are connected to the seat rail 24.

The vehicle body frame 5 is of a semi-double cradle type. A power unit 7 including a motor 40 and a battery unit 43 below the left and right main frames 17 behind the head pipe 16 and in front of the left and right pivot frames 18 is mounted on the vehicle body frame 5. The vehicle body frame 5 surrounds the power unit 7 from the front part and the lower portion using a single down frame 19 and the left and right lower frames 20.

The rear wheel suspension system 6 is equipped with a swing arm 30 that pivotally supports the rear wheel 3 at a rear end portion, a link mechanism 31 connected between the front part of the swing arm 30 and the lower portions of the pair of pivot frames 18, and a rear cushion 32 extending between the link mechanism 31 and the cross member 22.

The swing arm 30 is provided below the rear part of the vehicle body. The swing arm 30 extends forward and backward. A front end portion of the swing arm 30 is formed in a bifurcated shape that branches to the left and right sides, and is supported by the upper and lower intermediate portions of the pair of pivot frames 18 to be swingable vertically via a pivot shaft 33.

The link mechanism 31 has a link arm 34 and a link member 35. The link arm 34 is provided below the swing arm 30 in side view. The link arm 34 extends forward and backward. A front end portion of the link arm 34 is pivotably connected to the link support bracket 23a of the lower cross member 23. The link member 35 is formed in a triangular shape in side view. An upper portion of the link member 35 is pivotably connected to the front and rear intermediate portion of the swing arm 30. A rear lower portion of the link member 35 is pivotably connected to a rear end portion of the link arm 34. A rear cushion 32 is connected to the front part of the link member 35.

The rear cushion 32 is provided at the vehicle width center of the rear part of the vehicle body. The rear cushion 32 is formed in a cylindrical shape and extends vertically along an axial direction (a longitudinal direction) inclined forward.

The upper end portion of the rear cushion 32 is pivotably connected to the cushion support bracket 22a of the cross member 22. The lower end portion of the rear cushion 32 is pivotably connected to the front part of the link member 35.

The power unit 7 is equipped with a motor 40 for driving the vehicle, a battery unit 43 that is a power source of the motor 40, and a power control unit (PCU) 48 that controls the motor 40. The motor 40, the battery unit 43, and the PCU 48 are fixed and integrated with each other. The power unit 7 is fixedly supported on the vehicle body frame 5. The power unit 7 is disposed behind the down frame 19 and above the lower frame 20 in side view. Further, the power unit 7 is disposed to be sandwiched by the pair of main frames 17 and the pair of pivot frames 18 from the outside in the vehicle width direction. The lower portion of the power unit 7 is covered with an under-cover 27 attached to the lower frame 20.

The motor 40 is disposed at the rear part of the power unit 7. The motor 40 is fastened to the pivot frame 18. The motor 40 is equipped with a stator and a rotor (not shown), and a motor case 41 that accommodates the stator and the rotor. For example, the motor 40 is connected to the rear wheel 3 via a chain type transmission mechanism disposed on the left side of the rear part of the vehicle body. An outlet side piping connection part 41a to which the pipe 90 of the cooling device 9 is connected is provided on the left side surface of the motor case 41.

A battery unit 43 is arranged at the front part and the upper portion of the power unit 7. The battery unit 43 is disposed in front of and above the motor 40. The battery unit 43 is fastened to the down frame 19 and the lower frame 20. The battery unit 43 is equipped with a battery main body (not shown) and a hollow battery case 44 that accommodates the battery main body.

The battery case 44 is formed of, for example, a metal material such as aluminum or an aluminum alloy. The battery case 44 is equipped with a lower battery case 45 and an upper battery case 46. The lower battery case 45 is located in front of the motor 40. The lower battery case 45 is formed in a rectangular parallelepiped shape extending in the vertical direction, the front-rear direction, and the vehicle width direction. The upper battery case 46 is located above the motor 40 and the lower battery case 45. The upper battery case 46 is formed to be larger in the front-rear direction than the lower battery case 45. The upper battery case 46 is formed to be smaller than the lower battery case 45 in the vehicle width direction. Accordingly, the lower battery case 45 protrudes to both sides in the vehicle width direction further than the upper battery case 46. The upper battery case 46 is disposed between the pair of main frames 17. The upper battery case 46 is disposed between the pair of gussets 21. The lower battery case 45 and the upper battery case 46 are fastened to each other.

A PCU 48 is a control device which includes a power drive unit (PDU) that is a motor driver, an electric control unit (ECU) that controls the PDU, and the like. The PCU 48 is disposed below the motor 40 and the battery unit 43. A pair of lower frames 20 overlap the PCU 48 when viewed from below. The PCU 48 is equipped with a casing that accommodates a circuit board or the like. The casing of the PCU 48 is integrated with, for example, a motor case 41 of the motor 40. An inlet side piping connection part 48a to which the pipe 90 of the cooling device 9 is connected is provided on a left side surface of the casing of the PCU 48.

Figure 2:
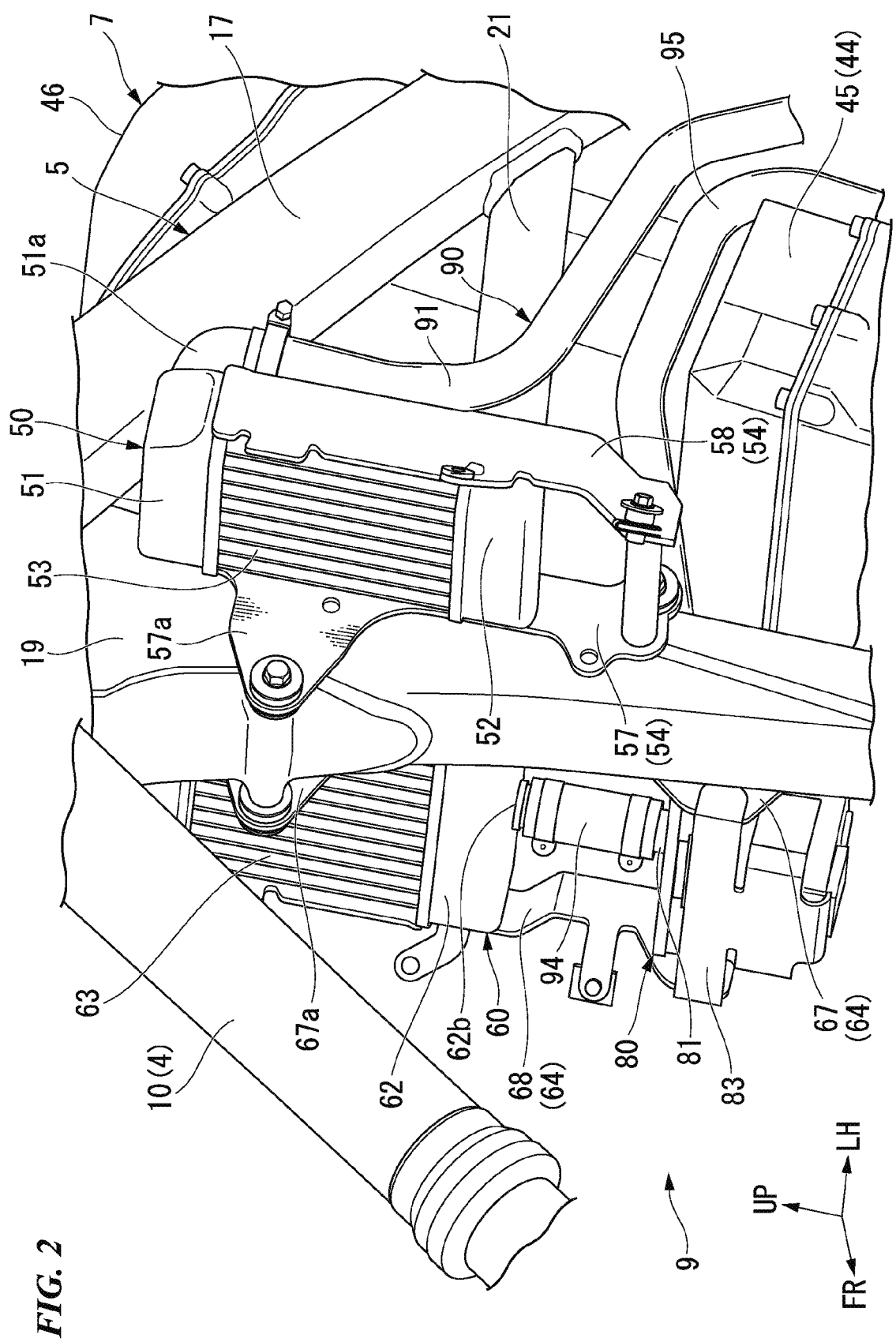
FIG. 2 is a perspective view of the vicinity of a cooling device according to the embodiment as viewed from in front to the left thereof.

FIG. 2 is a perspective view of the vicinity of the cooling device according to the embodiment as viewed from the left front.

As shown in FIG. 2, the cooling device 9 circulates cooling water to cool the power unit 7. The cooling device 9 is equipped with a first radiator 50 and a second radiator 60 that cool the cooling water, a pump 80 that pumps the cooling water, and a pipe 90 that forms a circulation path of the cooling water.

The first radiator 50 and the second radiator 60 are supported by the vehicle body frame 5.

For example, the first radiator 50 and the second radiator 60 are supported by the down frame 19. The first radiator 50 and the second radiator 60 are disposed in front of the upper battery case 46. The first radiator 50 and the second radiator 60 are disposed on both sides in the vehicle width direction across the down frame 19. The first radiator 50 is disposed on the left side of the down frame 19. The second radiator 60 is disposed on the right side of the down frame 19.

Figure 3:
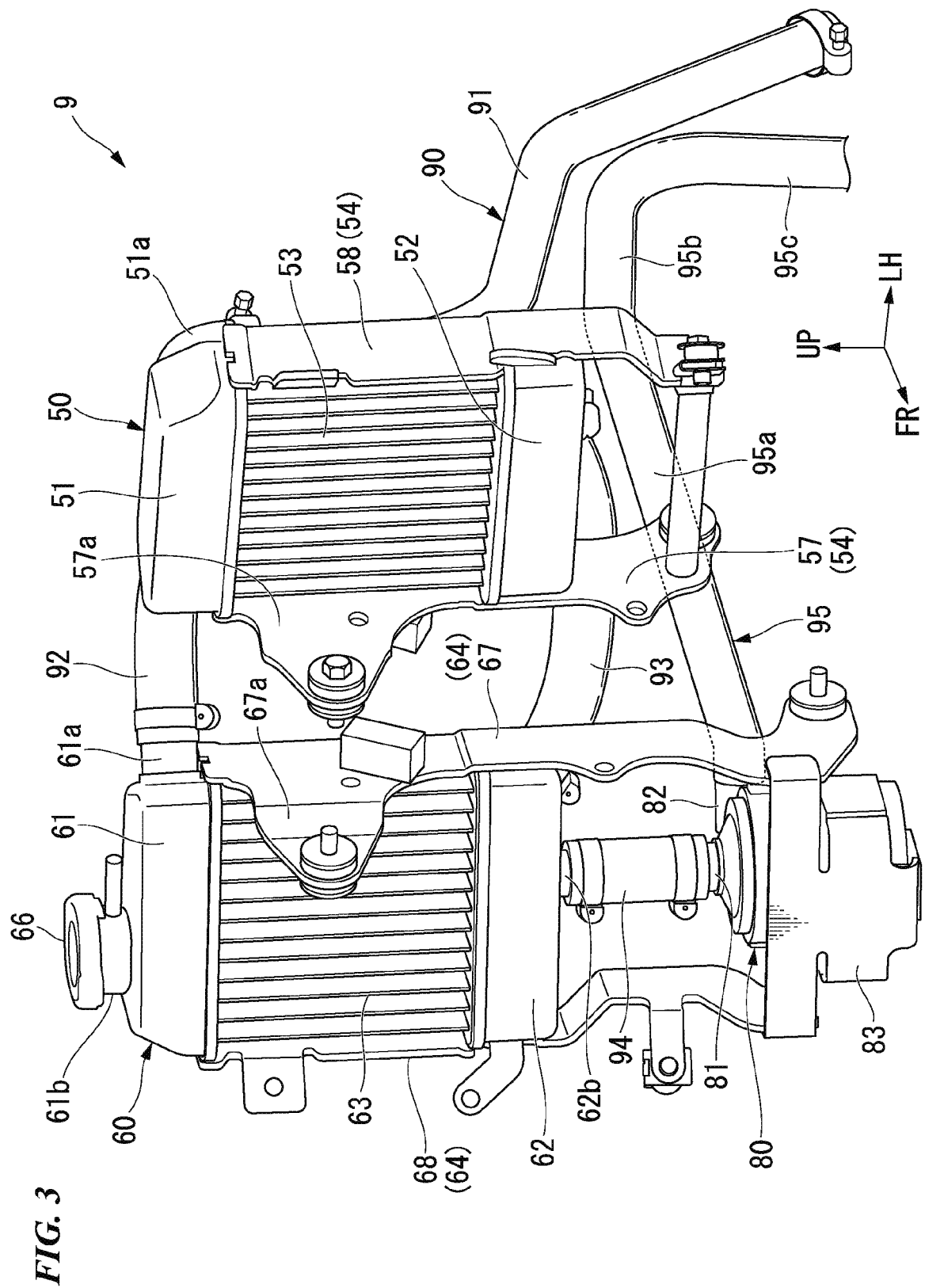
FIG. 3 is a perspective view of the cooling device of the embodiment as viewed from the left front.

FIG. 3 is a perspective view of the cooling device of the embodiment as viewed from the left front.

As shown in FIG. 3, the first radiator 50 is a down-flow type radiator. The first radiator 50 is equipped with an upper first tank 51 (a first tank) and a lower first tank 52 disposed above and below each other, a first radiator core 53 which is disposed between the upper first tank 51 and the lower first tank 52 to allow the cooling water to pass through, and a first frame 54 that connects the upper first tank 51 and the lower first tank 52.

The first radiator core 53 radiates heat of the cooling water flowing inside. The first radiator core 53 is formed in a rectangular plate shape extending approximately in the vertical direction and the vehicle width direction. The first radiator core 53 is disposed so that it is inclined slightly forward in side view, and an outer end portion in the vehicle width direction protrudes forward from an inner end portion in the vehicle width direction. For example, the first radiator core 53 is equipped with a plurality of cooling water tubes that allow the upper first tank 51 and the lower first tank 52 to communicate with each other.

Figure 4:
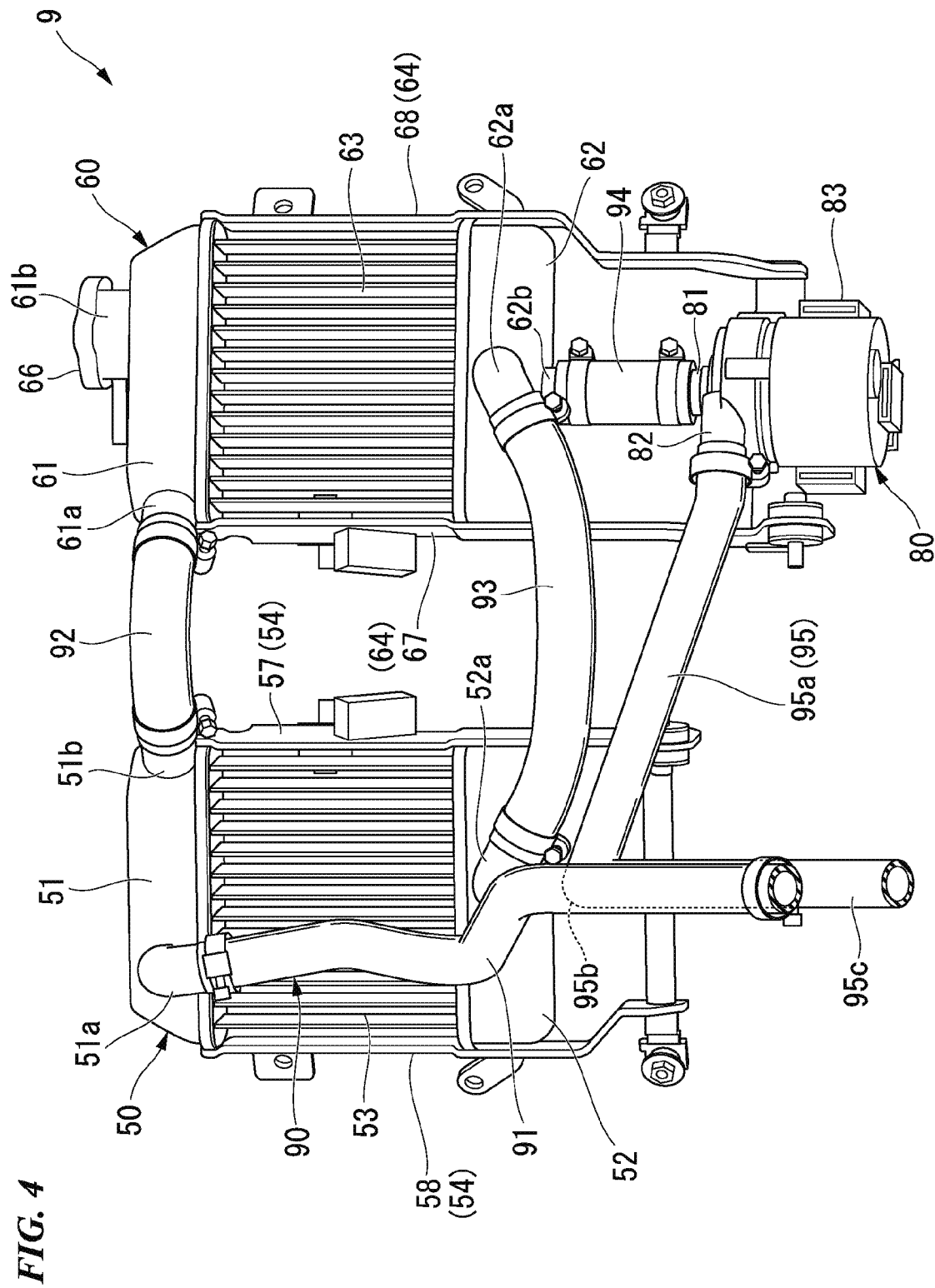
FIG. 4 is a rear view of the cooling device of the embodiment.

FIG. 4 is a rear view of the cooling device of the embodiment.

As shown in FIG. 4, the upper first tank 51 stores the cooling water that passes through the first radiator core 53. The upper first tank 51 is provided at the upper end of the first radiator 50. The upper first tank 51 is provided above the first radiator core 53. The upper first tank 51 extends in the vehicle width direction along the upper end of the first radiator core 53. A first introduction port 51a (an introduction port) and a flow division port 51b to which the pipe 90 is connected are formed in the upper first tank 51. The first introduction port 51a is a place in which the cooling water discharged from the power unit 7 initially reaches the first radiator 50 and the second radiator 60. The flow division port 51b is a place in which the cooling water in the upper first tank 51 is diverted toward an upper second tank 61 to be described later.

The first introduction port 51a and the flow division port 51b are formed on sides opposite to each other across the central portion of the upper first tank 51 in the vehicle width direction. More specifically, the first introduction port 51a and the flow division port 51b open into the upper first tank 51 on sides opposite to each other across the central portion of the upper first tank 51 in the vehicle width direction. The first introduction port 51a is provided at the outer end portion in the vehicle width direction on the rear surface of the upper first tank 51. The flow division port 51b is formed on the rear of the upper first tank 51 and a side surface of the upper first tank 51 facing inward in the vehicle width direction. The first introduction port 51a is formed in a cylindrical shape, extends rearward from the upper first tank 51, and then extends downward. The flow division port 51*b* is formed in a cylindrical shape, and extends rearward from the upper first tank 51 and inward in the vehicle width direction. The flow division port 51*b* extends rearward from the down frame 19 (see FIG. 2).

The lower first tank 52 stores the cooling water that has passed through the first radiator core 53. The lower first tank 52 is provided below the first radiator core 53. The lower first tank 52 extends in the vehicle width direction along the lower end of the first radiator core 53. A first discharge port 52*a* to which the pipe 90 is connected is formed in the lower first tank 52. The first discharge port 52*a* is provided at the central portion in the vehicle width direction on the rear surface of the lower first tank 52. The first discharge port 52*a* is formed in a cylindrical shape, extends rearward from the lower first tank 52, and then extends downward and inward in the vehicle width direction.

As shown in FIG. 3, the first frame 54 is equipped with a first inner frame 57 and a first outer frame 58. The first inner frame 57 is a plate-like member extending along the inner end portion of the first radiator core 53 in the vehicle width direction. The first inner frame 57 connects the inner end portion of the upper first tank 51 in the vehicle width direction and the inner end portion of the lower first tank 52 in the vehicle width direction. The first outer frame 58 is a plate-like member that extends along the outer end portion of the first radiator core 53 in the vehicle width direction. The first outer frame 58 connects the outer end portion of the upper first tank 51 in the vehicle width direction and the outer end portion of the lower first tank 52 in the vehicle width direction. The first inner frame 57 and the first outer frame 58 extend downward from the lower first tank 52. A fastening portion 57*a* that extends forward and is fastened to the down frame 19 is fixed to the first inner frame 57 (see FIG. 2).

The second radiator 60 is a down-flow type radiator. The second radiator 60 is disposed at the same height as the first radiator 50. The second radiator 60 is equipped with an upper second tank 61 and a lower second tank 62 disposed above and below each other, a second radiator core 63 disposed between the upper second tank 61 and the lower second tank 62 to allow the cooling water to pass through, and a second frame 64 (a stay) which connects the upper second tank 61 and the lower second tank 62.

The second radiator core 63 radiates the cooling water flowing inside. The second radiator core 63 is formed in a rectangular plate shape extending approximately in the vertical direction and the vehicle width direction. The second radiator core 63 is disposed so that it is inclined slightly forward in side view, and an outer end portion in the vehicle width direction protrudes forward from the inner end portion in the vehicle width direction. For example, the second radiator core 63 is equipped with a plurality of cooling water tubes that allow the upper second tank 61 and the lower second tank 62 to communicate with each other.

As shown in FIG. 4, the upper second tank 61 stores the cooling water that passes through the second radiator core 63. The upper second tank 61 is provided at the upper end of the second radiator 60. The upper second tank 61 is provided above the second radiator core 63. The upper second tank 61 extends in the vehicle width direction along the upper end of the second radiator core 63. A second introduction port 61*a* to which the pipe 90 is connected is formed in the upper second tank 61. The second introduction port 61*a* is formed on the rear side of the upper second tank 61 and a side surface the upper second tank 61 facing inward in the vehicle width direction. The second introduction port 61*a* is provided at the same height as the flow division port 51*b* of the upper first tank 51. The second introduction port 61*a* is formed in a cylindrical shape, and extends rearward from the upper second tank 61 and inward in the vehicle width direction. The second introduction port 61*a* extends to the rear side of the down frame 19 (see FIG. 2). A cooling water replenishment port 61*b* is further formed in the upper second tank 61*h*. The cooling water replenishment port 61*b* is formed at the outer end portion in the vehicle width direction on the upper surface of the upper second tank 61. The cooling water replenishment port 61*b* is closed by a cap 66.

The lower second tank 62 stores the cooling water that has passed through the second radiator core 63. The lower second tank 62 is provided below the second radiator core 63. The lower second tank 62 extends in the vehicle width direction along the lower end of the second radiator core 63. A merging port 62*a* and a second discharge port 62*b* (a discharge port) to which the pipe 90 is connected is formed in the lower second tank 62. The merging port 62*a* is provided at the central portion in the vehicle width direction on the rear surface of the lower second tank 62. The merging port 62*a* is provided at the same height as the first discharge port 52*a* of the lower first tank 52. The second discharge port 62*b* is provided at the central portion in the vehicle width 62*b* direction on the lower surface of the lower second tank 62. The merging port 62*a* is formed in a cylindrical shape, extends rearward from the lower second tank 62, and then extends downward and inward in the vehicle width direction. The second discharge port 62*b* is a place through which the cooling water discharged toward the power unit 7 finally passes in the first radiator 50 and the second radiator 60. The second discharge port 62*b* is formed in a cylindrical shape and extends downward from the lower second tank 62.

As shown in FIG. 3, the second frame 64 is equipped with a second inner frame 67 and a second outer frame 68. The second inner frame 67 is a plate-like member that extends along the inner end portion of the second radiator core 63 in the vehicle width direction. The second inner frame 67 connects the inner end portion of the upper second tank 61 in the vehicle width direction and the inner end portion of the lower second tank 62 in the vehicle width direction. The second outer frame 68 is a plate-like member extending along the outer end portion of the second radiator core 63 in the vehicle width direction. The second outer frame 68 connects the outer end portion of the upper second tank 61 in the vehicle width direction and the outer end portion of the lower second tank 62 in the vehicle width direction. The second inner frame 67 and the second outer frame 68 extend downward from the lower second tank 62. A fastening portion 67*a* that extends forward and is fastened to the down frame 19 is fixed to the second inner frame 67 (see FIG. 2).

As shown in FIG. 4, the pump 80 is disposed below the lower second tank 62 of the second radiator 60. The pump 80 is formed in a cylindrical shape extending in the vertical direction, and is equipped with an impeller inside. The pump 80 is equipped with a suction part 81 and a discharge part 82. The suction part 81 is formed in a cylindrical shape and protrudes upward from the casing upper surface of the pump 80. For example, the suction part 81 is disposed coaxially with the second discharge port 62*b* of the lower second tank 62. The discharge part 82 is formed in a cylindrical shape and protrudes inward in the vehicle width direction from the casing upper portion of the pump 80.

As shown in FIGS. 3 and 4, the pump 80 is supported by the second frame 64 of the second radiator 60 via the bracket 83. The bracket 83 is fixed to the second inner frame 67 and the second outer frame 68. The bracket 83 is formed to cover the pump 80 from the front. The bracket 83 supports the pump 80 from below and sandwiches the pump 80 in the vehicle width direction. A rubber is interposed between the bracket 83 and the pump 80.

The pipe 90 is equipped with a radiator introduction piping 91 that connects the power unit 7 (see FIG. 1) and the first radiator 50, and a first radiator connection piping 92 and a second radiator connection piping 93 that connect the first radiator 50 and the second radiator 60, a pump suction piping 94 that connects the second radiator 60 and the pump 80, and a pump discharge piping 95 that connects the pump 80 and the power unit 7.

As shown in FIGS. 1 and 4, the radiator introduction piping 91 guides the cooling water, which is discharged from the power unit 7, to the first radiator 50. The radiator introduction piping 91 is connected to the outlet side piping connection part 41a of the motor 40 and the first introduction port 51a of the upper first tank 51 of the first radiator 50. The radiator introduction piping 91 extends upward from the horizontal at all portions from the outlet side piping connection part 41a toward the first introduction port 51a. The radiator introduction piping 91 is disposed between a left main frame 17 and the lower battery case 45 in side view. The radiator introduction piping 91 passes through the outer side in the vehicle width direction than the left gusset 21 above the lower battery case 45.

As shown in FIG. 4, the first radiator connection piping 92 and the second radiator connection piping 93 guide the cooling water, which is discharged from the first radiator 50, to the second radiator 60. The first radiator connection piping 92 is connected to the flow division port 51b of the upper first tank 51 of the first radiator 50 and the second introduction port 61a of the upper second tank 61 of the second radiator 60. The first radiator connection piping 92 straddles the down frame 19 in the vehicle width direction behind the down frame 19 (see FIG. 2). The second radiator connection piping 93 is connected to the first discharge port 52a of the lower first tank 52 of the first radiator 50 and the merging port 62a of the lower second tank 62 of the second radiator 60. The second radiator connection piping 93 straddles the down frame 19 in the vehicle width direction behind the down frame 19.

The pump suction piping 94 guides the cooling water, which is discharged from the second radiator 60, to the pump 80. The pump suction piping 94 is connected to the second discharge port 62b of the lower second tank 62 of the second radiator 60 and the suction part 81 of the pump 80. The pump suction piping 94 extends downward from the horizontal at all portions from the lower second tank 62 toward the pump 80. In the present embodiment, the pump suction piping 94 extends linearly in the vertical direction.

As shown in FIGS. 1 and 4, the pump discharge piping 95 guides the cooling water, which is discharged from the pump 80, to the power unit 7. The pump discharge piping 95 is connected to the discharge part 82 of the pump 80 and the inlet side pipe connection part 48a of the PCU 48. The pump discharge piping 95 extends from the pump 80 toward the power unit 7 on the opposite side behind the down frame 19 across the down frame 19.

As shown in FIG. 1, the pump discharge piping 95 is equipped with a first portion 95a, a second portion 95b, and a third portion 95c. The first portion 95a extends along the front surface of the battery case 44. The second portion 95b is continuous with the first portion 95a and extends along the upper surface of the lower battery case 45 and the left side surface of the upper battery case 46. The third portion 95c is continuous with the second portion 95b and extends along the rear surface of the lower battery case 45 and the left side surface of the motor 40.

As shown in FIGS. 3 and 4, the first portion 95a is connected to the discharge part 82 of the pump 80. The first portion 95a extends outward (leftward) in the vehicle width direction and upward from the discharge part 82 of the pump 80. The first portion 95a extends linearly when viewed from the front-rear direction. The second portion 95b extends rearward from the connection part with the first portion 95a. The second portion 95b extends linearly. The third portion 95c extends downward from the connection part with the second portion 95b. The third portion 95c is connected to the inlet side piping connection part 48a of the PCU 48.

The pump discharge piping 95 extends in the horizontal or downward direction in all areas from the pump 80 toward the PCU 48 in a self-supporting state which uses a side stand of the motorcycle 1. In the present embodiment, the first portion 95a and the second portion 95b of the pump discharge piping 95 extend horizontally in the self-supporting state. Further, in the present embodiment, the third portion 95c of the pump discharge piping 95 extends downward from the horizontal in the self-supporting state. Further, the self-supporting state is a state in which the upper portion of the vehicle is displaced and inclined to the left with respect to a state in which the vehicle body stands vertically, such as a traveling time.

The cooling water of the power unit 7 enters the upper first tank 51 of the first radiator 50 from the outlet side piping connection part 41a of the motor 40 through the first introduction port 51a. Some of the cooling water that has entered the upper first tank 51 passes through the first radiator core 53, is cooled by exchanging heat with the outside air, and enters the lower first tank 52. The cooling water that has entered the lower first tank 52 is discharged from the first discharge port 52a and enters the lower second tank 62 of the second radiator 60 through the merging port 62a. The remainder of the cooling water that has entered the upper first tank 51 is discharged from the flow division port 51b and enters the upper second tank 61 of the second radiator 60 through the second introduction port 61a. The cooling water that has entered the upper second tank 61 passes through the second radiator core 63, is cooled by exchanging heat with the outside air, and enters the lower second tank 62. The cooling water that has passed through the first radiator core 53 merges with the cooling water that has passed through the second radiator core 63 in the lower second tank 62. The cooling water that has entered the lower second tank 62 is discharged from the second discharge port 62b and is sucked into the pump 80. The cooling water sucked into the pump 80 is pumped toward the inlet side piping connection part 48a of the PCU 48 and introduced into the power unit 7.

As described above, in the present embodiment, since the first radiator 50 and the second radiator 60 are disposed on both sides in the vehicle width direction across the down frame 19, it is possible to reduce a region occupied by the radiator in the vertical direction, without reducing a thermal radiation area, as compared to a case in which a single radiator is disposed to avoid the down frame 19. Therefore, it is possible to provide a space in which the pump 80 is disposed below the first radiator 50 and the second radiator 60. Further, since the pump 80 is disposed below the second radiator 60, it is possible to avoid the pump suction piping 94 leading from the second radiator 60 toward the pump 80 from being inclined upward. Therefore, the air mixed in the circulation path of the cooling water is not easily mixed into the pump 80 from the second radiator 60, and the air flowing into the pump 80 can be smoothly released upward. Therefore, it is possible to reduce the occurrence of air entrainment of the pump 80.

In addition, the introduction port 51*a* and the flow division port 51*b* are formed in the upper first tank 51 of the first radiator 50. The introduction port 51*a* and the flow division port 51*b* are formed on sides opposite to each other across the central portion of the upper first tank 51 in the vehicle width direction. Here, when the introduction port and the flow division port are close to each other in the upper first tank 51, most of the cooling water introduced into the upper first tank 51 from the introduction port is discharged from the flow division port, and there is likelihood that the cooling water passing through the first radiator core may be insufficient. According to the present embodiment, since the cooling water introduced into the upper first tank 51 from the introduction port 51*a* flows in the upper first tank 51 along the vehicle width direction, most of the cooling water introduced into the upper first tank 51 can be prevented from being discharged from the flow division port 51*b*. Accordingly, the cooling water can be divided from the upper first tank 51 to both the first radiator core 53 and the upper second tank 61 of the second radiator 60, and a sufficient amount of cooling water can pass through the first radiator core 53. Therefore, it is possible to efficiently use both the first radiator 50 and the second radiator 60.

Further, the cooling device 9 is equipped with a pump discharge piping 95 connected to the discharge part 82 of the pump 80 and the power unit 7. The pump discharge piping 95 extends from the pump 80 to the opposite side across the down frame 19 in the vehicle width direction, and extends horizontally or downward from the pump 80 toward the power unit 7 in a self-supporting state which uses the side stand of the motorcycle 1. According to this configuration, it is possible to avoid the pump discharge piping 95 from being inclined downward from the power unit 7 toward the pump 80 in the self-supporting state which uses the side stand. As a result, even if air is mixed into the pump discharge piping 95 in the self-supporting state, the air in the pump discharge piping 95 can be guided to the pump 80 and further smoothly released upward from the pump 80. Therefore, it is possible to more reliably prevent the occurrence of air entrainment of the pump 80.

Furthermore, the second radiator 60 is equipped with a second frame 64 that extends downward. The pump 80 is fixed to the second frame 64. According to this configuration, since the pump 80 can be fixed using the components that constitute the second radiator 60, it is possible to prevent the number of components from being increased.

Further, as compared with a case in which a new component is provided in addition to the second radiator 60 to fix the pump 80, the positioning between the second radiator 60 and the pump 80 becomes easier, and it is possible to improve the assembling property of the second radiator 60 and the pump 80.

Further, the first introduction port 51*a* into which cooling water discharged from the power unit 7 is introduced is formed in the first radiator 50, and the second discharge port 62*b* through which the cooling water is discharged toward the power unit 7 is formed in the second radiator 60. According to this configuration, the cooling water introduced from the first introduction port 51*a* can be discharged from the second discharge port 62*b* after passing through both the first radiator 50 and the second radiator 60. Therefore, both the first radiator 50 and the second radiator 60 can be used efficiently.

The present invention is not limited to the above-described embodiment described with reference to the drawings, and various modified examples are conceivable within the technical scope.

For example, in the above-described embodiment, the application to an off-road motorcycle has been described as an example, but the use thereto is not limited at all.

For example, a saddle riding type electric vehicle includes all vehicles on which a driver rides across a vehicle body, and includes not only motorcycles but also three-wheel vehicles (a front two-wheel and a rear one-wheel in addition to a front one-wheel and a rear two-wheel vehicle). Further, the present invention is applicable not only to motorcycles but also to four-wheeled vehicles such as automobiles.

Although the first radiator 50 and the second radiator 60 are down-flow type radiators in the above embodiment; however, the embodiment is not limited thereto. The first radiator 50 and the second radiator 60 may be cross-flow type radiators.

Further, although the pump 80 is disposed below the second radiator 60 in the above embodiment, it may be disposed below the first radiator 50. Further, the cooling device may be formed such that the cooling water discharged from the power unit 7 is introduced into the second radiator and discharged from the first radiator toward the power unit 7.

In addition, it is possible to appropriately replace the constituent elements in the above-described embodiments with known constituent elements without departing from the scope of the present invention.

What is claimed is:

1. A saddle riding electric vehicle, comprising:
   a power unit which has a motor configured to drive a vehicle, a battery serving as a power source of the motor, and a control unit configured to control the motor;
   a vehicle body frame which supports the power unit, and has a head pipe configured to support a front wheel in a steerable manner, and a down frame extending downward from the head pipe;
   a first radiator and a second radiator disposed on both sides in a vehicle width direction across the down frame; and
   a pump which circulates cooling water between the first radiator, the second radiator and the power unit,
   wherein the pump is disposed, in top view, vertically below one radiator of the first radiator and the second radiator.

2. The saddle riding electric vehicle according to claim 1, wherein the first radiator includes:
   a first radiator core, and
   a first tank which stores cooling water passing through the first radiator core,
   the second radiator includes:
   a second radiator core, and
   a second tank which stores cooling water passing through the second radiator core,
   the first tank extends along a predetermined direction,
   a first introduction port through which the cooling water discharged from the power unit is introduced, and a flow division port configured to divide the cooling water toward the second tank are formed in the first tank, and the first introduction port and the flow division port are formed on opposite sides across a central portion of the first tank in the predetermined direction.

3. The saddle riding electric vehicle according to claim 1, wherein an introduction port through which the cooling water discharged from the power unit is introduced is formed in one radiator of the first radiator and the second radiator, and
a discharge port through which the cooling water is discharged toward the power unit is formed in the other radiator of the first radiator and the second radiator.

4. A saddle riding electric vehicle, comprising:
a power unit which has a motor configured to drive a vehicle, a battery serving as a power source of the motor, and a control unit configured to control the motor;
a vehicle body frame which supports the power unit, and has a head pipe configured to support a front wheel in a steerable manner, and a down frame extending downward from the head pipe;
a first radiator and a second radiator disposed on both sides in a vehicle width direction across the down frame;
a pump which circulates cooling water between the first radiator, the second radiator and the power unit; and
a discharge piping connected to a discharge part of the pump and the power unit,
wherein the pump is disposed below one radiator of the first radiator and the second radiator, and
the discharge piping extends from the pump to an opposite side across the down frame in the vehicle width direction, and extends horizontally or downward from the pump toward the power unit in a self-supporting state in which a side stand is used.

5. The saddle riding electric vehicle according to claim 4, wherein an introduction port through which the cooling water discharged from the power unit is introduced is formed in one radiator of the first radiator and the second radiator, and
a discharge port through which the cooling water is discharged toward the power unit is formed in the other radiator of the first radiator and the second radiator.

6. A saddle riding electric vehicle, comprising:
a power unit which has a motor configured to drive a vehicle, a battery serving as a power source of the motor, and a control unit configured to control the motor;
a vehicle body frame which supports the power unit, and has a head pipe configured to support a front wheel in a steerable manner, and a down frame extending downward from the head pipe;
a first radiator and a second radiator disposed on both sides in a vehicle width direction across the down frame; and
a pump which circulates cooling water between the first radiator, the second radiator and the power unit,
wherein one of the first and second radiators includes a stay extending downward, and
the pump is fixed to the stay.

7. The saddle riding electric vehicle according to claim 6, wherein an introduction port through which the cooling water discharged from the power unit is introduced is formed in one radiator of the first radiator and the second radiator, and
a discharge port through which the cooling water is discharged toward the power unit is formed in the other radiator of the first radiator and the second radiator.

* * * * *